Sept. 1, 1970 P. LÖSCH 3,526,721

REVERTIVE CALL CIRCUIT

Filed Feb. 2, 1967 4 Sheets-Sheet 1

Sept. 1, 1970 P. LÖSCH 3,526,721

REVERTIVE CALL CIRCUIT

Filed Feb. 2, 1967 4 Sheets-Sheet 3

Sept. 1, 1970 P. LÖSCH 3,526,721

REVERTIVE CALL CIRCUIT

Filed Feb. 2, 1967 4 Sheets-Sheet 4

United States Patent Office 3,526,721

Patented Sept. 1, 1970

3,526,721
REVERTIVE CALL CIRCUIT

Peter Lösch, Stuttgart-Cannstatt, Germany, assignor to International Standard Electric Corporation, New York, N.Y., a corporation of Delaware Filed Feb. 2, 1967, Ser. No. 613,663
Claims priority, application Germany, Feb. 2, 1966, St 24,936
Int. Cl. H04m 13/00
U.S. Cl. 179—17 10 Claims

ABSTRACT OF THE DISCLOSURE

An internal connection between the two subscribers of a two-party line is established by positioning the final selector, seized by the calling subscriber, onto the common party line and by cancelling the busy criterion of this party line in the final selector for the time it makes a busy-test. Thus a ringing circuit is established for the called subscriber and a series-connection of the two subscribers of the two-party line is prepared in the party-line-switch.

Feeding current for subscribers is provided by the final selector, the other components of the exchange, having participated in establishing the connection are held operative in local circuits.

The present invention relates to a method to provide a connection between subscriber stations over a telephone exchange via a two-party switch. The German patent specification 761,539 describes a circuit arrangement for two party lines in which the internal traffic between the subscribers of the same two-party line is initiated by pressing the ground button of the calling subscriber the handset still on the cradle. To this end the subscriber stations, connected via a switch of a two-party line, are equipped with a transformer, inserted in front of the dial stages, to discern between an internal and an external connection. When receiving the criterion for the internal traffic of both subscribers, participating in a two-party line, the dial stages of the exchange are not set. Both subscriber sets are only series-connected via the above-mentioned pretransformer. An external connection is initiated by dialling the call number of the subscriber desired, whereby the dial stages are controlled and set in a way known per se. Discrimination of both types of traffic is made by the run down of a relay actuation. For power feeding the subscribers, in common, the inventive idea of the German patent specification 737,222 is used providing a reduction of the microphone current, in order to enable an internal connection of two-party line subscribers. To evaluate the criterion, whether an internal or an external connection is concerned, the installation of an additional switching means is necessary according to the German patent specification 737,222. The internal connection can be established, after lifting the handset, by pressing the ground button or by dialling a code number. In the latter case the switching means for internal connection, furnishing the feeder current and causing the ringing of the second subscriber, can be arranged in front or behind the dial pulse receiver, set by dialling the code digit.

Moreover, additional measures in the subscriber circuit are necessary serving at internal traffic to mark the calling subscriber of the two-party connection.

It is the object of the invention to reduce the expenditure for the connection of two-party lines in systems employing of two-party lines. Instead of the transformer, necessary for each two-party line connection according to the art, the expenditure is substantially reduced in telephone systems with a large number of two-party lines, if said transformer is inserted into the connecting paths also used for external connections, because their number in exchange is far less than the number of the possible subscribers.

The method according to the invention is characterized in this that the calling party of a two-party line, having seized a final selector is set to the subscriber circuit of the respective two-party line, that in the already seized outgoing path on the side of the calling subscriber the busy condition is cancelled, in order to enable testing of the final selector of the same line, that after testing of said final selector, a ringing circuit for the subscriber called is prepared by switching means in the two-party line switch, that the set of the called subscriber is powerfed, after said subscriber has answered, by the final selector or the group selector, and that the connecting elements of the call established, besides the final selector, are kept operative.

Thereby a different signalling for internal and external connections, e.g., by special switching means, is avoided. It is possible, according to the invention, to reach the called subscriber in the internal traffic by dialling a complete call number. Besides the substantially reduced expenditures in systems of this kind, it is an advantage of the invention that it is possible to increase the number of subscribers to an exchange system by connecting two-party lines and to enable the internal traffic between said two-party lines without the necessity for the calling partner to know the called party, connected to such a two-party line.

According to prior art it would be necessary, however, to inform the respective subscribers on each switching of a single connection to a two-party connection or vice versa, so that they can initiate an internal connection by a particular measure. For the two-party line switch, to be provided when switching a single line to a two-party line, the measure according to the invention means an additional expenditure by one relay to receive the criterion, hitherto given for internal traffic by a special measure. This expenditure is widely cancelled by another centralisation in the connecting paths for the switching means hitherto required for two-party connections. In using a subscriber circuit, suited for single connections, as well as for two-party connections another substantial advantage is that for such a circuit arrangement to operate a two-party connection, only a two-party switch according to the invention must be added. In systems of the present invention, neither a rearrangement nor an exchange of parts already installed in the system is necessary. Further explanations of the method according to the invention is given in the following description.

The accompanying drawings show different types of circuit arrangements to carry out the method according to the invention.

Figure 1:
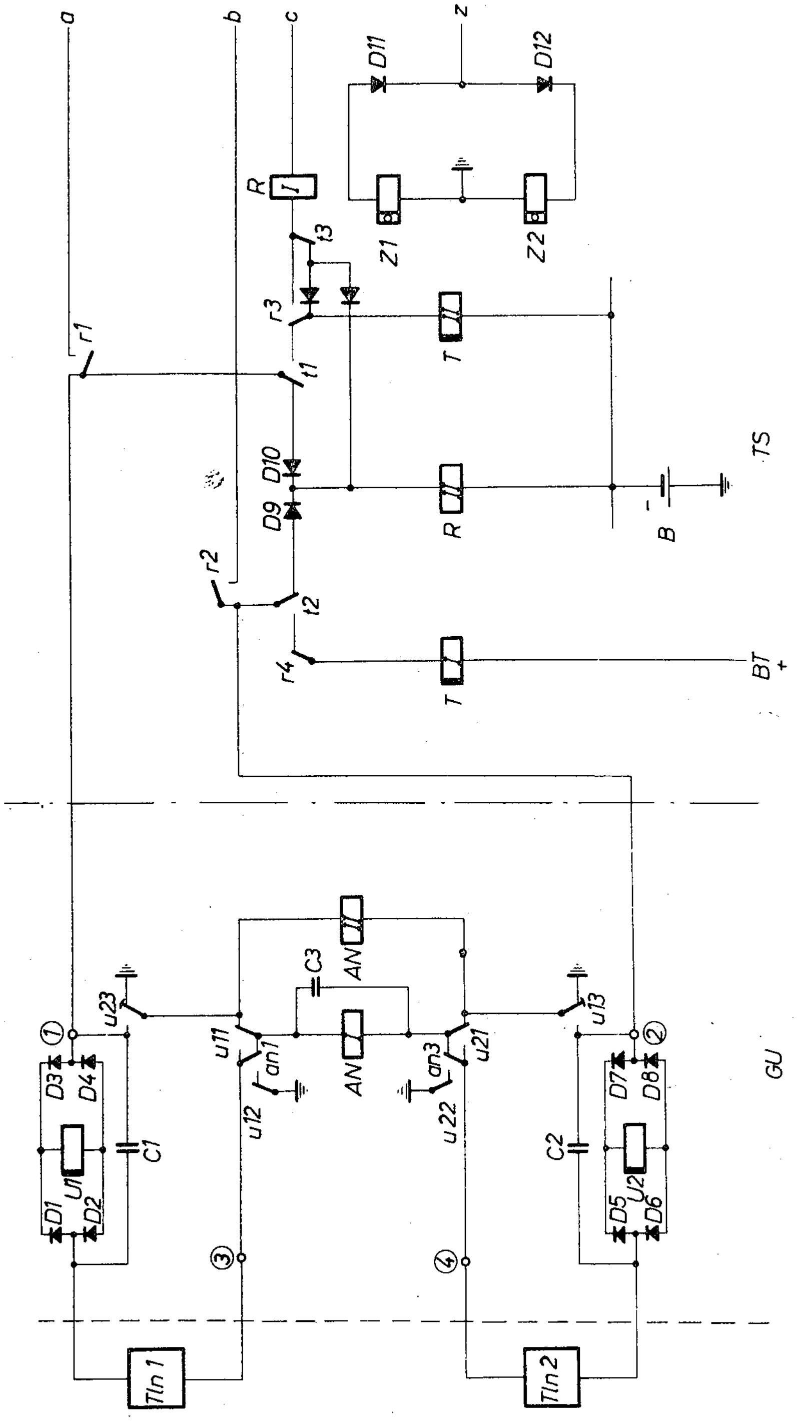
FIG. 1 shows a subscriber circuit of the type known heretofore, to which two subscribers are connected, using a two-party line switch.

The two-party line switch GU in FIG. 1 comprises for each subscriber a relay U1 and U2 respectively and a common relay AN. Both subscriber sets T*ln*1 and T*ln*2 are connected to the following transmission paths via the subscriber circuit TS. The subscriber circuit comprises the ringing relay R and the disconnecting relay T. Moreover, the pertinent call counters Z1 for the subscriber set T*ln*1 and Z2 for the subscriber set T*ln*2 are shown on this drawing.

Figure 2:
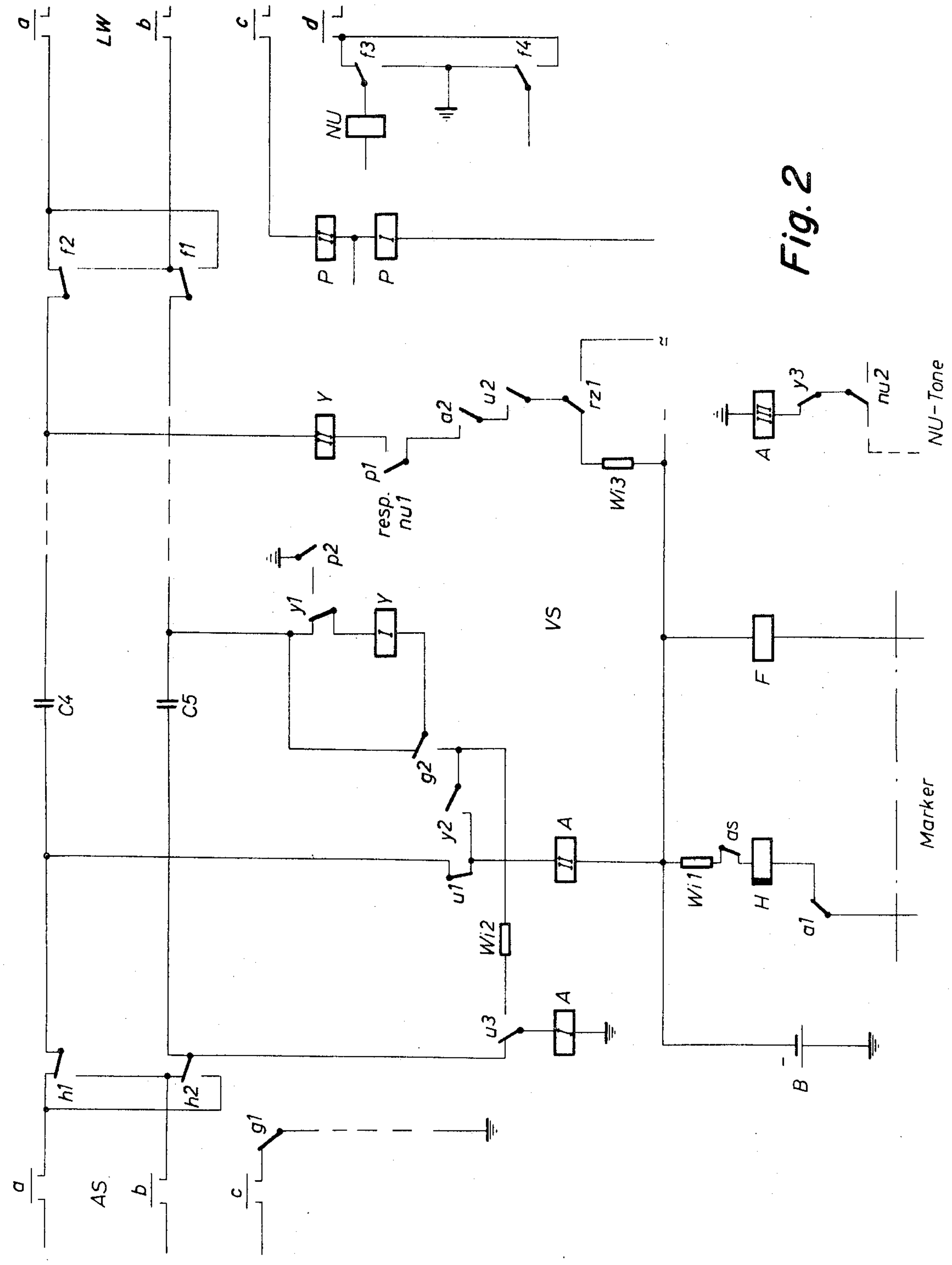
FIG. 2 shows a junctor suitable for the internal traffic of both subscribers of the two-party line with only minimal expenditure.

The junctor VS, shown in FIG. 2, forms the transmission path established in a way known per se. Beside the line finder AS and the final selector LW, the feed relays AI and II and YI and II for the calling and the called subscriber are shown.

For the internal traffic of the subscribers of the two-party line relay H serves to identify the calling subscriber and relay F to identify the called subscriber. The function of relay G, not shown on the drawing, to evaluate the busy condition will be explained in detail later on. Moreover, relay NU is shown, in order to evaluate the criterion "subscribers cannot be reached."

It is assumed that the subscriber T*ln*1 wants to talk to subscriber T*ln*2, by dialling the complete call number.

If subscriber T*ln*1 lifts his handset, ground potential is applied to the *a*-wire, causing relay R to respond via:

(1) B-, BII, D10, *t*1, D4, U1, D1, T*ln*1, *an*1, *u*11, *u*23, ground.

Relay U1 cannot pull up via the high-ohmic winding RII and consequently receives marginal current.

If upon this initiation, a line finder AS through-connects the speech wires *ab* to the junctor according to FIG. 2 relay U1 can respond via the low-ohmic winding AII of relay A in the junctor via:

(2) B-, AII, *u*1, *h*1, AS*a* (FIG. 1), *r*1, D4, U1, D1, T*ln*1, *an*1, *u*11, *u*23 ground and in parallel a circuit may be traced from *an*1 through ANI, *u*21, *u*13, ground, and said relay is held via the actuated contact *u*13, *b*-wire-*r*2, (FIG. 2) AS*b*, *h*2, *u*3, AI, ground.

The response of relay A via its windings AII and AI prior to the response of relay H is a criterion, that the subscriber set T*ln*1 is connected.

If, on the other hand, the subscriber 2 calls and the line finder has switched through, the following circuit is formed in which relay A does not receive current and cannot respond consequently:

(3) (FIG. 2) ground, AI, *u*3, *h*2, AS*b*, *b*-wire (FIG. 1), *r*2, D8, U2, D5, T*ln*2, *an*3, *u*21, *u*13, ground.

In this case relay H in the junctor can respond via the closed bridge contact as of the line finder AS and via contact *a*1, storing the criterion that the subscriber 2 has called; thereupon the relays A and U2 respond.

Now the calling condition of subscriber set 1 shall be demonstrated further. The subscriber set T*ln*2 is at first shunted through the contacts *u*13, *u*21 and *an*3, and both speech wires are connected to the subscriber station T*ln*1 Thereby the starting relay AN is connected to the feed-wire in such a way that it cannot respond due to its oppositely effective windings:

(4) (FIG. 2), B-, AII, *u*1, *h*1, AS*a*, (FIG. 1), *r*1, D4, U1, D1, T*ln*1, *an*1, ANI, *u*21, *u*13, *r*2, *b*-wire (FIG. 2), AS*b*, *h*2, *u*3, AI, ground and in parallel a circuit may be traced from U21 through ANII, *u*23, ground.

The call number is dialled in a way known per se. The marker thereby finds out that the second subscriber set of the same or of another two-party line is concerned and relay F (FIG. 2) responds upon ground potential received from the marker. It thereby designates that the subscriber set T*ln*2 is the party called.

At first the final selector LW is set and an unsuccessful testing across the windings I and II of relay P which tests, according to the prepositions, onto the same subscriber circuit to which also the calling subscriber T*ln*1 is connected. This switching condition is characterized by pulling up of a busy condition relay G not shown on the drawing which circuit is interrupted by the test wire of the calling subscriber set through contact *g*1. Thus the test relay P can retest immediately and hold the relays R and T of the subscriber circuit (FIG. 1) through contact *r*3. If another telephone set, participating in the two-party line, has been called although said station is busy, the connection is released and restricted to the subscriber circuit. Through a contact of relay G a relay U, not shown on the drawing, responds which switches over through its contacts *u*1, *u*2 and *u*3 (FIG. 2), feeding on the outgoing end of the connection. The resistor W*i*2 is dimensioned thus, that relay A in the connecting path and relay U1 in the two-party switch (FIG. 1) is held energized.

The contacts *f*1 and *f*2 (FIG. 2) provide a change of polarity on the speech wires and now relay AN can respond with the aid of its two windings, now being excited in the same direction:

(5) (FIG. 2) B-, W*i*3, *rz*1, *u*2, *p*1, YII, *f*2, *b*-wire, LW*b*, *b*-wire, to *u*21, ANI, *u*11, T*ln*1, D2, U1, D3, *r*1, *a*-wire to LW (FIG. 2), LW*a*, *f*1, Y1, *y*1, *g*2, W*i*2, *u*3, AI, ground and in parallel a circuit may be traced from U13 through ANII, *u*23, and ground.

By actuating contact *an*3 the shunt for the subscriber station T*ln*2 is cancelled and ground potential is applied via contact *u*22 to one wire, so that ringing can be given via contact *rz*1 (FIG. 2) of a ringing relay, not shown on the drawing, towards said ground potential.

In the last mentioned supervising circuit for the feeder relay of both subscriber sets the winding Y1 is oppositely effective to the winding YII; consequently relay Y cannot pull up.

If subscriber T*ln*2 lifts the handset thereby actuating the cradle switch, ground potential and contact *u*22 causes, via contact *an*3, subscriber set 2, *b*-wire towards the winding YII, that the winding Y1, oppositely effective towards winding YII, becomes ineffective, and relay Y now responds through winding YII, controllable by the subscriber set T*ln*2.

(6) (FIG. 2), B-, *rz*1, *u*2, *a*2, *p*1, YII, *f*2, *b*-wire LW*b*, *b*-wire to TS (FIG. 1), *r*2, D8, U2, D5, T*ln*2, *an*3, *u*22, ground.

Relay Y deenergizes relay G not shown on the drawing, and its winding YI is switched through its contact *y*1 and *y*2 so that it operates in the same sense as winding YII, applying negative potential in series with the winding AII. After relay G has dropped contact *g*2 applies ground potential to the *b*-wire via winding YI.

Thereupon relay U2 in the two-party switch is energized across the above mentioned circuit 6.

Contact *u*22 disconnects ground potential and contact *u*21 series-connects both subscriber stations T*ln*1 and T*ln*2 in series.

As the relay G is disconnected by relay Y both subscriber sets now receive feeding power through the windings YI and YII. Consequently a DC-loop is established via (FIG. 2):

(7) B-, W*i*3, *rz*1, *u*2, *a*2, *p*1, YII, *f*2, *b*-wire, LW*b*, *b*-wire to TS (FIG. 1), *r*2.

*u*13, ANII, *u*23, *r*1, *a*-wire (FIG. 2), LW*a*, *f*1, *g*2, Y1, *y*1, *p*2, ground and in parallel a circuit may be traced from *r*2 through D8, U2, D5, T*ln*2, U21, ANI, *u*11, T*ln*1, D2, U1, D3, *r*1, *a*-wire (FIG. 2), LW*a*, *f*1, *g*2, Y1, *y*1, *p*2, ground.

The speech path now runs in the two-party switch (FIG. 1) via the capacitors C1, C2 and C3 and in the connecting path (FIG. 2) via the capacitors C4 and C5. Relay A is held via (FIG. 2):

(8) B-, AII, *y*2, W*i*2, *u*3, TI, ground.

The connecting is released by restoring the handset through one of the two subscribers participating the call. Relay Y1 and II and AI and II drop and the loop is restricted to the subscriber circuit from which the subscriber having not yet restored the handset, receives busy tone, in a way known per se, via (FIG. 1) BT, winding TI, and the contacts *r*4 and *r*2, as well as via the *b*-wire.

If the connecting path is equipped with a particular signal to indicate the condition that the called subscriber cannot be reached, a capacitor, not shown on the drawing, thereupon checks a counting circuit, consisting of the counters Z1, Z2 (FIG. 1) and the diodes D11, D12, to determine whether the counter of the dialled subscriber is connected. If, as shown the subscriber station T*ln*2 has been called, a circuit is formed, after the testing process, via the capacitor not shown on the drawing, the relay NU (FIG. 2), the contacts *f*3 and *f*4, and the counting circuit. If the subscriber cannot be reached and if relay NU cannot pull up due to the not-connected counter, a particular signal is transmitted inductively to the calling subscriber via the winding AIII and the contacts *nu*2 and *y*3.

Figure 3:
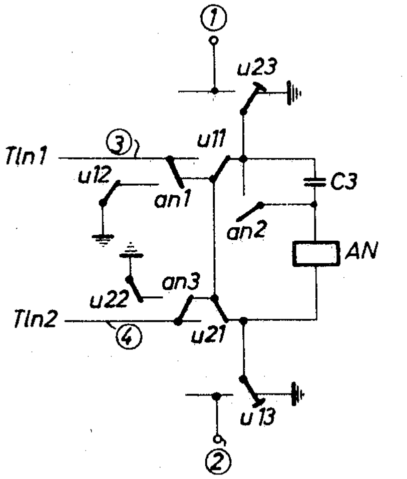
FIGS. 3 and 4 show further advantageous arrangements for the two-party line switch.

Deviating from the example shown in the FIGS. 1 and 2 relay AN can also be energized through ringing current towards ground. FIG. 3 shows another embodiment of the circuit arrangement to be connected between terminals ①, ②, ③ and ④ of FIG. 1.

Therefrom results the following circuit:

(9) (FIG. 2) ringing current, *rz*1, *u*2, *a*2, *p*1, YII, *f*2, LD*b*, *b*-wire, (FIG. 1) *r*2, ② (FIG. 3), *u*13, *u*21, *u*11, ③ (FIG. 1) T*ln*1, D2, U1, D3, *r*1, *a*-wire, LW*a*, *f*1, *y*1 YI, *g*2, W*i*2, *u*3, AI, ground and in parallel a circuit may be traced from YI through (FIG. 3) AN, C3, *u*23, ground.

Figure 4:
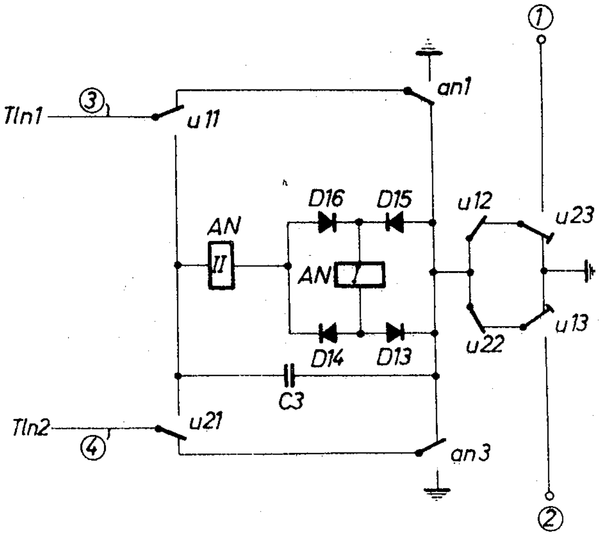

Relay AN has only one winding. Said relay AN is held via its contact *an*2 and, when the call is established (i.e., when contacts *u*13 and *u*23 are actuated), the winding AN is located between the wires of the subscriber line and consequently in parallel to the subscriber sets. Line ringing current is transferred to the called subscriber set, at not-actuated relays U1 and U2, of a two-party line connected via a two-party switch (GU) across the not-actuated contacts *an*3, *u*21, *u*13 towards ground. Through contacts *u*13, *u*23 and *u*11 and *u*21 relay AN is shunted and cannot pull up. In order to avoid damping, occurring according to FIG. 3 relay AN is completely removed from the connection according to the example shown in FIG. 4, if the call has been established.

The ground potential necessary for starting the circuit is led to both subscribers in common via the contacts *u*13, *u*23 and 12, *u*22. The minor modifications, compared to circuit 1, can easily be gathered from the figure. Relay AN has two windings which allows the relay to be pulled up because the two windings are actuating in the same sense.

Consequently, circuit 5 changes in the following way:

(10) (FIG. 2) B-, W*i*3, *rz*1, *u*2, *a*2, *p*1, YII, *f*2, LW*b* *b*-wire, (FIG. 1) *r*2, ② (FIG. 4) *u*13, *u*22, D13, ANI, D16, ANII, *u*11, 3 (FIG. 1) T*ln*1, D2, U1, D3, *r*1, *a*-wire. (FIG. 2) LW*a* *f*1, *y*1, Y1, *g*2, W*i*2, *u*3, A1, ground.

It can be seen that the relay AN is in the loop of the calling subscriber. The further establishment of the connection is performed in a way described with the aid of FIGS. 1 and 2, until the called subscriber T*ln*2 lifts his handset. After relay U2 has been switched-in, the connection is established from subscriber T*ln*1 to subscriber T*ln*2 via the contacts *u*11 and *u*21.

Figure 5:
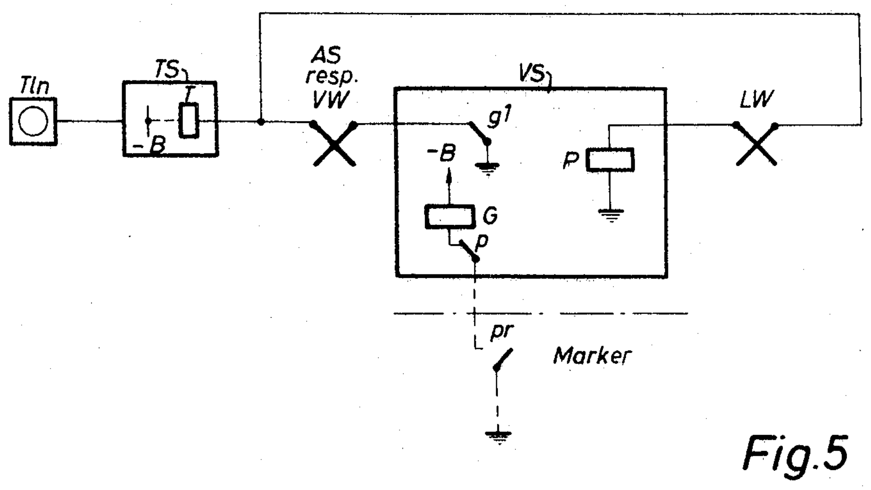
FIG. 5 shows a circuit arrangement with only one junctor in the circuit diagram, with the aid of which junctor the method according to the invention can be performed in line-finder or preselector systems, respectively.

In FIG. 5 the object of the invention is again shown by a functional block diagram. It may be gathered that, e.g., the method described for systems with line finders (AS) can also be used for systems with preselectors (VW), because here too the busy potential is cancelled by contact *g*1, in order to have the test relay P in the junctor VS (test on the same subscriber circuit) (TS) used for connecting the two-party line. Contact *pr* in the marker determines, in a way known per se, a limitation of the testing period, used to energize relay G.

Figure 6:
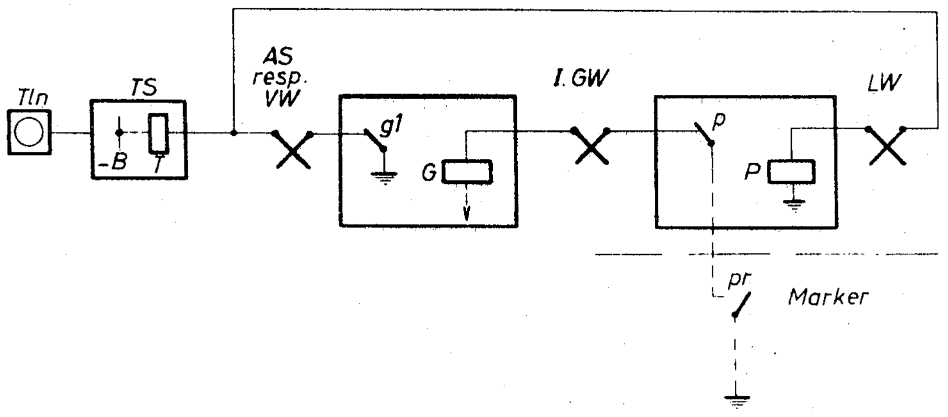
FIG. 6 shows a circuit diagram for systems with group selecting stages in line-finder or preselector systems, respectively, to carry out the method according to the invention.

FIG. 6 shows the method according to the invention for an arrangement passing across several dial stages. When inserting another switching stage (I.GW) the emission of a backward criterion from the final selector to the line finder or preselector respectively, becomes necessary. This criterion is given through a contact *pr* after the testing period has elapsed unsuccessful, through a wire of the switching stages, in order to actuate relay G which, in a way already described, disconnects busy potential from the subscriber circuit.

What is claimed is:

1. A revertive call circuit arrangement for providing a connecting path between calling and called subscriber stations on the same two-party line comprising a two-party line switch, final selector means seized by a station identified as belonging to said two-party line, means for cancelling a busy signal normally received by said calling subscriber when said connecting path is already seized on the outgoing end, means for enabling said selector means to make a busy testing of said line, switching means in said two-party line switch for connecting a ringing circuit to said line after said testing by said selector means to enable said called subscriber station to be rung, means for series-connecting said calling and called subscriber stations, and means for furnishing power for said called station after said station has answered, said power being furnished from said selector means in a common feeding.

2. The circuit arrangement of claim 1, wherein said arrangement includes junctor means having final selector means, line finder means, and switching means in said final selector means for disconnecting the busy marking of said junctor at the outgoing end when said junctor is in the seized condition.

3. The circuit arrangement of claim 1 wherein said selector means emits a revertive call signal when testing a seized output, and means for cancelling the busy marking at the outgoing lead of the established connecting path, said system having no fixed association between the outgoing and terminating end of said connecting path.

4. The circuit arrangement of claim 1, including a common switching means operated responsive to a polarity change in said selector means for preparing to send said ringing circuit to the subscriber station to be called in the case of revertive call traffic, and means responsive to the lifting of a handset of said called subscriber station for establishing said series-connection between said calling and called subscriber stations.

5. The circuit arrangement of claim 1 including switching means individually associated with said calling and called subscriber stations, said switching means being operated during revertive calls for applying ringing current to said called subscriber station, and means responsive to the lifting of a handset of said called subscriber station for establishing said series-connection between said calling and called subscriber stations.

6. The circuit arrangement of claim 2 and line feed relay means common to the calling and to the called subscriber stations for supplying battery to the calling and the called subscriber stations, said relay means being series-connected in said switching means of said connecting path during revertive call traffic before said called subscriber station answers for supervising the condition of the line.

7. The circuit arrangement of claim 6, wherein one winding of said line feed relay means is connected in the opposite sense to the second winding of said relay means to supply power to the called subscriber station during revertive call traffic, said connection being made when said called subscriber answers, said relay being connected in the supervising circuit for both subscriber sets, said line feed relay means thus being prevented from operating over said second winding by the loop established for said calling subscriber station.

8. The circuit arrangement of claim 7 wherein the battery feed of said called subscriber station is symmetrical in the case of revertive call traffic, and said line feed means provides a common battery feeding circuit to both said calling and called stations of said two-party line.

9. The circuit arrangement of claim 2 including means for releasing a call connection established in a revertive call responsive to the disconnecting of said series-connection of said calling and called subscriber stations when either said calling or called subscribers stores the handset of a subscriber station.

10. The circuit arrangement of claim 2 including feed counter means, means for determining the availability of said called subscriber of said two-party line responsive to said busy testing to determine whether said feed counter for said called subscriber is connected, and means for forwarding a separate signal from said final selector means to said calling subscriber to indicate nonavailability of said called subscriber.

References Cited

UNITED STATES PATENTS

| | | | |
|---|---|---|---|
| 1,291,587 | 1/1919 | Martin. | |
| 1,912,453 | 6/1933 | Hauland | 179—17 |
| 2,187,186 | 1/1940 | Wallace | 179—17 |

KATHLEEN H. CLAFFY, Primary Examiner

J. S. BLACK, Assistant Examiner